United States Patent
Shimizu et al.

(10) Patent No.: US 6,906,482 B2
(45) Date of Patent: Jun. 14, 2005

(54) WINDOW GLASS OBSTRUCTION DETECTOR

(75) Inventors: Yoshihiro Shimizu, Aichi (JP); Yasuhiro Shimomura, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/829,054

(22) Filed: Apr. 21, 2004

(65) Prior Publication Data

US 2004/0212338 A1 Oct. 28, 2004

(30) Foreign Application Priority Data

Apr. 22, 2003 (JP) ........................................ 2003-117470

(51) Int. Cl.[7] ................................................ H02P 1/00
(52) U.S. Cl. ...................... 318/286; 318/286; 318/434; 318/443; 318/466; 49/26; 49/28
(58) Field of Search ................................ 318/280–283, 318/286, 466, 468, 434, 443, 445; 49/26–28

(56) References Cited

U.S. PATENT DOCUMENTS

| | | | | |
|---|---|---|---|---|
| 5,422,551 A | * | 6/1995 | Takeda et al. | 318/265 |
| 5,689,160 A | * | 11/1997 | Shigematsu et al. | 318/281 |
| 5,774,046 A | * | 6/1998 | Ishihara et al. | 340/438 |
| 5,983,567 A | * | 11/1999 | Mitsuda | 49/26 |
| 6,100,658 A | * | 8/2000 | Kume et al. | 318/286 |
| 6,388,406 B1 | * | 5/2002 | Kyrtsos | 318/286 |
| 6,573,677 B2 | * | 6/2003 | Gerbetz | 318/445 |
| 6,667,590 B2 | * | 12/2003 | Nagaoka | 318/286 |
| 6,779,303 B2 | * | 8/2004 | Park et al. | 49/28 |

FOREIGN PATENT DOCUMENTS

| | | |
|---|---|---|
| JP | 09-021274 | 1/1997 |
| JP | 10-169315 | 6/1998 |

* cited by examiner

Primary Examiner—Rina Duda
(74) Attorney, Agent, or Firm—Patterson, Thuente, Skaar & Christensen, P.A.

(57) ABSTRACT

A detector, that prevents erroneous detection of a foreign object caught in a window glass when the engine of a vehicle is being operated and when the engine is stopped using a relatively simple control method. The detector includes a pulse sensor for detecting rotational speed of a motor. A microcomputer calculates a cycle difference sum based on the rotational speed of the motor. The microcomputer compares the cycle difference sum with a obstruction determination threshold to determine whether a foreign object has been caught. The microcomputer detects whether the engine is stopped. When detecting that the engine is stopped, the microcomputer changes the obstruction determination threshold so that the probability of the microcomputer determining that a foreign object has been caught is lower than that when the engine is being operated.

15 Claims, 2 Drawing Sheets

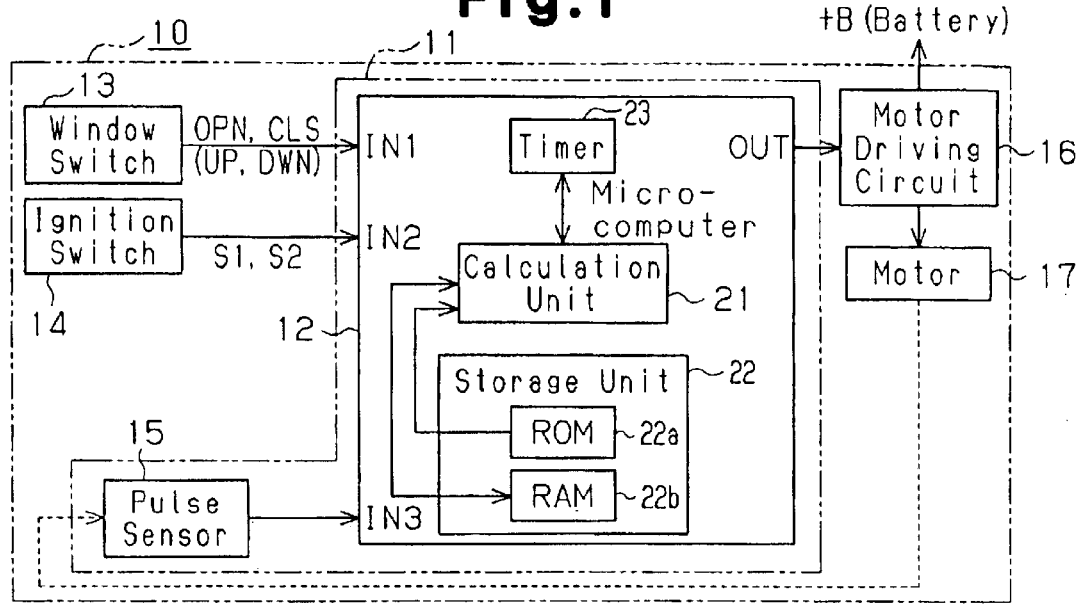
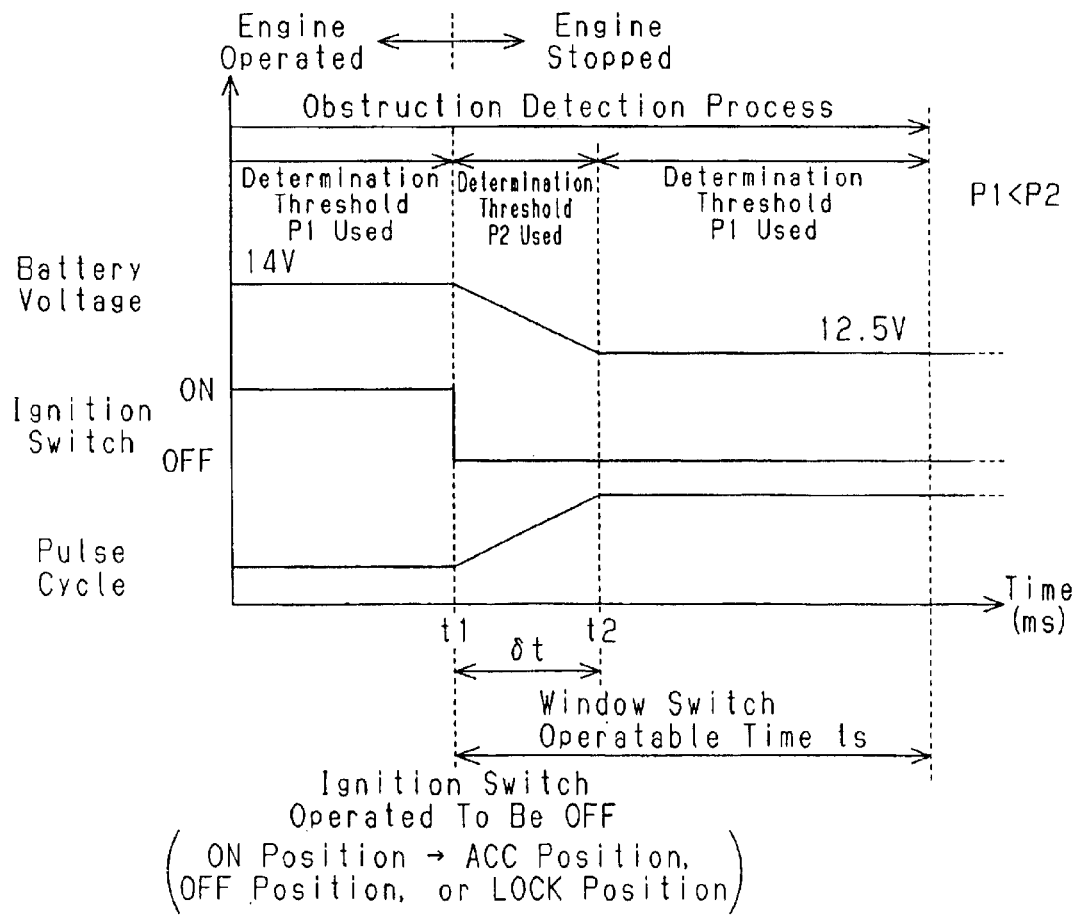

WINDOW GLASS OBSTRUCTION DETECTOR

BACKGROUND OF THE INVENTION

The present invention relates to a detector, and more particularly, to a window glass obstruction detector for detecting a foreign object caught in a window glass.

Power window apparatuses, which raise and lower a window glass of an automobile using the driving force of a motor, are conventionally known. The motor is driven by operating a window switch provided, for example, in a side door of the automobile. Some power window apparatuses have an anti-obstruction function. A foreign object such as a finger may be caught between a window glass and the window frame when the window glass is operated to close. If this happens, the power window apparatus with the anti-obstruction function stops the closing operation of the window glass, and then opens the window glass to free the foreign object.

Methods for detecting such obstruction by a foreign object include a "voltage/current detection method" and a "pulse detection method".

As one example, Japanese Laid-Open Patent Publication No. 9-21274 discloses a detector employing the voltage/current detection method for detecting obstruction by a foreign object. This detector monitors changes in the power supply voltage (or in the motor voltage applied to a motor) and changes in the motor current, and detects an obstruction based on the amount of change in the voltage and the amount of change in the current. To be more specific, when the amount of change in the power supply voltage or in the motor voltage exceeds a preset voltage determination threshold, the detector does not detect obstruction by a foreign object in consideration of the influence of changes in the power supply voltage or in the motor voltage. In this way, the detector avoids erroneous detection of the obstruction. When the amount of change in the voltage is equal to or below the voltage determination threshold and the amount of change in the current is equal to or above a predetermined current determination threshold, the detector determines that a foreign object has been caught and stops or reverses the motor.

As one example, Japanese Laid-Open Patent Publication No. 10-169315 discloses a detector employing the pulse detection method for detecting obstruction by a foreign object. This detector detects obstruction by a foreign object based on a pulse signal. The pulse signal has a cycle proportional to the rotational speed of a motor for operating the window glass. When a foreign object is caught in the window glass, the rotational speed of the motor decreases. When the rotational speed of the motor decreases, the pulse cycle of the motor becomes longer accordingly. The detector detects the obstruction by comparing the amount of change in the pulse cycle (the rotational speed of the motor) per unit time with a preset threshold.

The pulse cycle of the motor also changes as the voltage of a battery for supplying power to the motor changes. Specifically, the pulse cycle of the motor becomes shorter as the battery voltage increases and the rotational speed of the motor increases. The pulse cycle of the motor becomes longer as the battery voltage deceases and the rotational speed of the motor decreases. The battery voltage changes when, for example, impacts or vibrations are generated by opening or closing a door or by driving the vehicle on a rough road. While the window glass is being operated, the pulse cycle of the motor also changes as the battery voltage changes. The detector also considers the influence of such changes in the pulse cycle caused by changes in the battery voltage when determining whether a foreign object has been caught in the window glass. In this way, the detector avoids erroneous detection of the obstruction (i.e., erroneous determination that a foreign object has been caught in the window glass when nothing has been actually caught in the window glass) based on changes in the pulse cycle caused by changes in the battery voltage.

When external loads, such as impacts generated by opening or closing a door and impacts (vibrations) caused by driving the vehicle on a rough road, are applied to the vehicle or when electric loads change, such as when an air conditioner and a car stereo are switched on, the battery voltage and the pulse cycle change suddenly. The above-described conventional detector deals with such sudden changes in the battery voltage and the pulse cycle. In other words, the detector does not detect such sudden changes in the battery voltage and the pulse cycle, which are caused by impacts, vibrations, or the supply of power to the electric loads, as a foreign object obstructing the movement of the window glass.

The conventional detector, however, may fail to avoid erroneous detection when the engine of the vehicle is stopped and the voltage and the pulse cycle change gradually due to the stopped engine. The detector may erroneously detect obstruction by a foreign object based on such gradual changes in the voltage and in the pulse cycle. A complex control program is required for monitoring not only sudden changes but also gradual changes in the battery voltage and the pulse cycle (change amounts per unit time). By considering both the sudden and gradual changes using such a complex control program, erroneous detection of the obstruction may be prevented.

To prevent erroneous detection by considering both the sudden and gradual changes without using a complex control program, the detector may use the same program (i.e., the same detection probability) to execute both an anti-erroneous-detection process for the sudden change and an anti-erroneous-detection process for the gradual change. This structure, however, fails to provide accuracy in either the anti-erroneous detection process for the sudden change or the anti-erroneous detection process for the gradual change. This is because a control program to be used by the detector to detect the obstruction inevitably is a program to be used exclusively in a detection process for the sudden change or in a detection process for the gradual change, or is a program to be used in a detection process for a change that falls between the sudden change and the gradual change. It is difficult to provide accuracy in both the anti-erroneous detection process for the sudden change and the anti-erroneous detection process for the gradual change. It is unrealistic that an anti-erroneous detection process considering both the sudden and gradual changes be realized using a single control program.

If a control program for preventing erroneous detection caused by the sudden change is used in a detection process for the gradual change, the detector may erroneously detect obstruction by a foreign object based on the gradual change. When, for example, the engine is stopped while the window glass is being operated to close and the battery voltage and the pulse cycle change gradually due to the stopped engine, the detector may erroneously detect obstruction by a foreign object based on this gradual change.

If a control program for preventing erroneous detection caused by the gradual change is used in a detection process for the sudden change, the detector may erroneously detect obstruction by a foreign object based on the sudden change. When, for example, impacts are generated by opening or closing of a door while the engine is being operated and the window glass is being operated to close, and the battery voltage and the pulse cycle change suddenly due to the impacts, the detector may erroneously detect obstruction by a foreign object based on this sudden change.

For the reasons described above, it is difficult to provide accuracy in both the anti-erroneous detection process for the gradual change and the anti-erroneous detection process for the sudden change without using a complex program.

SUMMARY OF THE INVENTION

The present invention provides a detector that prevents erroneous detection of a foreign object caught in a window glass while the engine is being operated and when the engine is stopped, using a relatively simple control method.

The present invention provides a detector for detecting a foreign object caught in a window glass of a vehicle having an engine when the window glass is moved by a power window apparatus that is provided with power supply voltage from the vehicle. The detector includes a parameter detection unit for detecting at least one parameter that changes as the power supply voltage to the power window apparatus changes. A determination target value calculation unit, connected to the parameter detection unit, calculates a determination target value based on the at least one parameter detected by the parameter detection unit. A determination unit compares the determination target value with a predetermined determination threshold and determines whether a foreign object has been caught based on a result of the comparison. An engine-stop detection unit detects whether the engine of the vehicle is stopped. A threshold change unit for changes, when the engine-stop detection unit detects that the engine is stopped, the determination threshold so that the probability of the determination unit determining that a foreign object has been caught is lower than that when the engine is being operated.

A further aspect of the present invention is a detector for detecting a foreign object caught in a window glass of a vehicle having an engine when the window glass is moved by a motor. The detector includes a sensor, connected to the motor, for detecting rotational speed of the motor and generating a sensor signal according to the rotational speed of the motor. A microcomputer, connected to the sensor, calculates a determination target value based on the sensor signal provided from the sensor, compares the determination target value with a first determination threshold when the engine of the vehicle is being operated, compares the determination target value with a second determination threshold during a period from when the engine of the vehicle is stopped to when a predetermined time elapses after the engine is stopped, and determines whether a foreign object has been caught based on a result of the comparison.

A further aspect of the preset invention is a power window apparatus for mounting on a vehicle having an engine, an electrical power supply and a window glass for connection to the electrical power supply and opening and closing the window glass of the vehicle. The power window apparatus includes a window switch operated to open or close the window glass and for outputting an opening-operation signal or a closing-operation signal. A motor is used to open and close the window glass and for connection to the electrical power supply. A motor control unit, connected to the motor, controls the motor. The motor control unit rotates the motor in a forward direction in response to the opening-operation signal provided from the window switch, and rotates the motor in a reverse direction in response to the closing-operation signal provided from the window switch. A detector, connected to the window switch and the motor control unit, detects whether a foreign object has been caught in the window glass. The detector includes a parameter detection unit for detecting at least one parameter that changes as voltage of the electrical power supply connected to the motor changes. A determination target value calculation unit, connected to the parameter detection unit, calculates a determination target value based on the at least one parameter detected by the parameter detection unit. A determination unit compares the determination target value with a predetermined determination threshold and determines whether a foreign object has been caught based on a result of the comparison. An engine-stop detection unit detects whether the engine of the vehicle is stopped. A threshold change unit changes, when the engine-stop detection unit detects that the engine is stopped, the determination threshold so that the probability of the determination unit determining that a foreign object has been caught is lower than that when the engine is being operated. The motor control unit controls the motor to stop or open the window glass when the detector detects that a foreign object has been caught in the window glass.

A further aspect of the present invention is a power window apparatus for mounting on a vehicle having an engine and a window glass for opening and closing the window glass of the vehicle. The power window apparatus includes a window switch operated to open or close the window glass and for outputting an opening-operation signal or a closing-operation signal. A motor is used to open and close the window glass. A motor driving circuit, connected to the motor, controls the motor. A sensor, connected to the motor, detects rotational speed of the motor and generates a sensor signal according to the rotational speed of the motor. A microcomputer, connected to the window switch and the motor driving circuit, calculates a determination target value based on the sensor signal provided from the sensor, compares the determination target value with a first determination threshold when the engine of the vehicle is being operated, compares the determination target value with a second determination threshold during a period from when the engine of the vehicle is stopped to when a predetermined time elapses after the engine is stopped, determines whether a foreign object has been caught in the window glass based on a result of the comparison, and when determining that a foreign object has been caught, generates a driving control signal to control the motor to stop or open the window glass, and provides the motor driving circuit with the driving control signal.

A further aspect of the present invention is a method for detecting whether a foreign object has been caught in a window glass of a vehicle having an engine when the window glass is moved by a power window apparatus connected to an electrical power supply. The method includes detecting at least one parameter that changes as voltage of the electrical power supply connected to the power window apparatus changes, calculating a determination target value based on the detected parameter, comparing the determination target value with a first determination threshold, determining whether a foreign object has been caught based on a result of the comparison between the determination target value and the first determination threshold, and changing a target threshold with which the determination target value is to be compared from the first determination threshold to a second determination threshold when the engine of the vehicle is stopped so that the probability of determining that a foreign object has been caught is lower than that when the engine is being operated.

A further aspect of the present invention is a computer-readable medium including a program recorded thereon for detecting whether a foreign object has been caught in a window glass of a vehicle having an engine when the window glass is moved by a power window apparatus connected to an electrical power supply. The program when executed by a computer causes the computer to perform steps including, detecting at least one parameter that changes as voltage of the electrical power supply connected to the power window apparatus changes, calculating a determination target value based on the detected parameter, comparing the determination target value with a first determination threshold, determining whether a foreign object has been caught based on a result of the comparison between the determination target value and the first determination threshold, and changing a target threshold with which the determination target value is to be compared from the first determination threshold to a second determination threshold when the engine of the vehicle is stopped so that the probability of determining that a foreign object has been caught is lower than that when the engine is being operated.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a schematic block diagram of a detector according to a preferred embodiment of the present invention;

FIG. 2 is a timing chart showing the relationship between a battery voltage and a pulse cycle according to the preferred embodiment of the present invention.

DETAILED DESCRIPTION OF THE PREFERRED EMBODIMENTS

Figure 3:
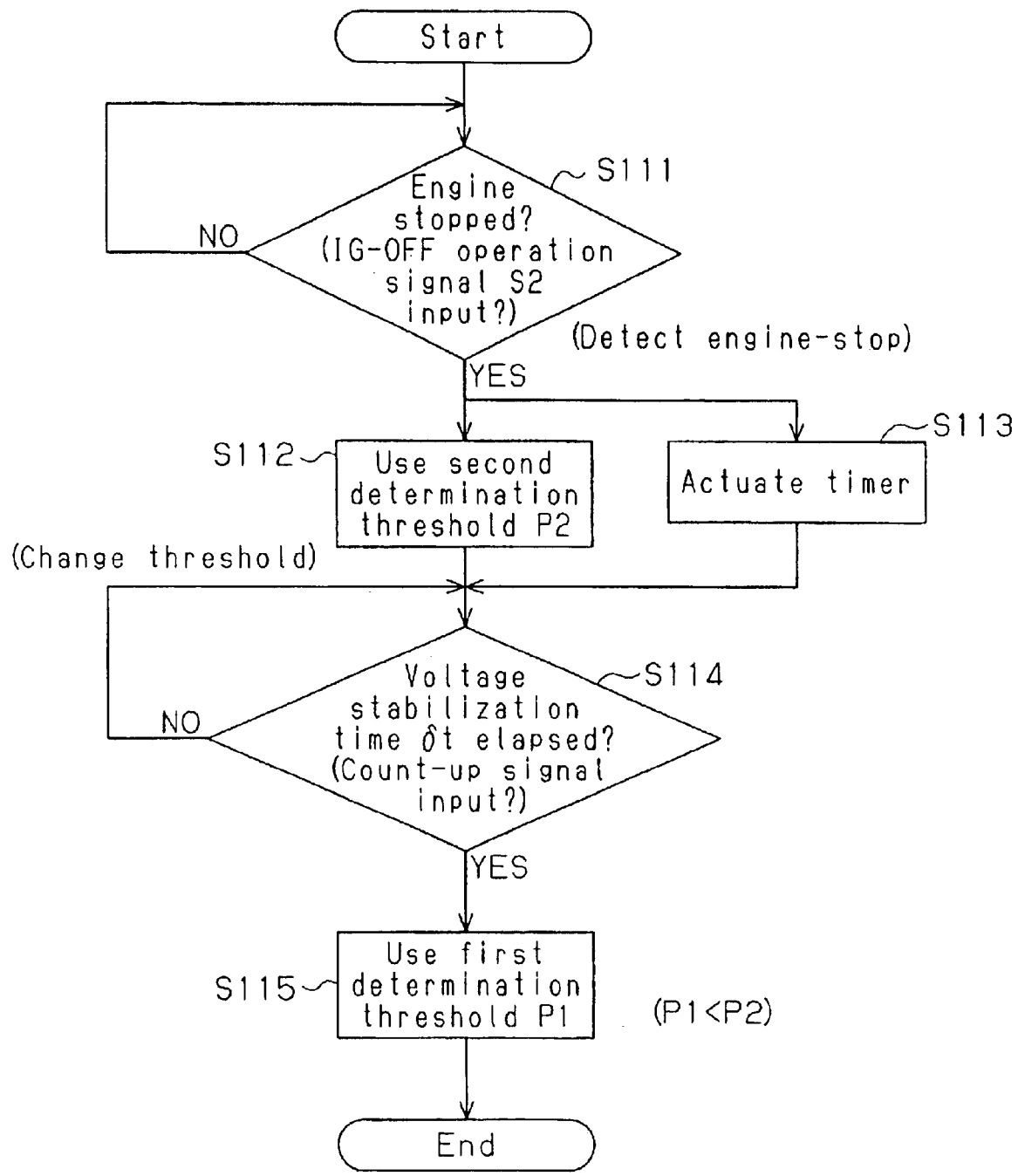
FIG. 3 is a flowchart showing an anti-erroneous detection process when an engine is stopped executed by a calculation unit included in the detector of FIG. 1.

The following describes a power window apparatus 10 and a detector 11 according to a preferred embodiment of the present invention with reference to FIGS. 1 to 3.

As shown in FIG. 1, the power window apparatus 10 includes the detector 11, a window switch 13, an ignition switch 14, a motor driving circuit 16, and a motor 17. The detector 11 detects a foreign object such as a finger caught in a window glass. The detector 11 includes a microcomputer 12 and a pulse sensor 15. The microcomputer 12 has first, second, and third input terminals IN1, IN2, and IN3 and an output terminal OUT. The window switch 13 is connected to the first input terminal IN1. The ignition switch 14 is connected to the second input terminal IN2. The pulse sensor (encoder) 15 is connected to the third input terminal IN3. The motor 17 is connected to the output terminal OUT via the motor driving circuit 16.

[Window Switch 13]

The window switch 13 is operated to open and close the window glass (not shown). The window switch 13 is arranged, for example, on the side door of an automobile or in the vicinity of a passenger in the passenger compartment. When the window switch 13 is operated to open the window glass by, for example, a driver, the window switch 13 provides the microcomputer 12 with an opening-operation signal OPN via the first input terminal IN1. When the window switch 13 is operated to close the window glass by the driver, the window switch 13 provides the microcomputer 12 with a closing-operation signal CLS via the first input terminal IN1.

[Ignition Switch 14]

The ignition switch 14 functions as a switch for an engine ignition device (not shown) and a switch for a starter motor. The ignition switch 14 is arranged integrally with a steering lock mechanism (not shown). The ignition switch 14 further functions as a switch for switching the functional position of the electrical system of the vehicle. The ignition switch 14 is switched to one of a LOCK position, an OFF position, an ACC (accessory) position, an ON position, and a START position, by inserting an ignition key (not shown) in a key slot (not shown) of a key cylinder (not shown) and turning the ignition key.

At the LOCK position, the engine is stopped, and the ignition key is inserted and removed. At the LOCK position, a steering wheel is locked by the steering lock mechanism. At the OFF position, the engine is stopped, and power is not supplied to the electrical system of the vehicle. At the ACC position, the engine is stopped, and power is supplied to the electrical system of the vehicle only to actuate accessories such as a car audio system, a car air-conditioner, and/or a wiper. At the ON position, the engine is operated, and power is supplied to the entire electrical system of the vehicle. At the START position, the starter motor is driven.

To start the engine, the driver inserts the ignition key in the key slot of the key cylinder, and turns the ignition key to switch the ignition switch 14 to the START position. This causes the starter motor to start the engine. When the driver releases the ignition key after the engine is started, the ignition switch 14 is automatically switched from the START position to the ON position, and is maintained at the ON position.

When the ignition switch 14 (and the ignition key as well) is at the ON position, the ignition switch 14 provides the microcomputer 12 with an ignition-ON signal (hereafter referred to as an "IG-ON signal S1") via the second input terminal IN2. When the ignition switch 14 is at other positions (i.e., at the ACC position, the OFF position or the LOCK position), the ignition switch 14 provides the microcomputer 12 with an ignition-OFF operation signal via the second input terminal IN2. An ignition-OFF operation signal is hereafter referred to as an "IG-OFF operation signal S2".

[Pulse Sensor 15]

The pulse sensor 15 is connected to the motor 17 and detects the rotational speed of the motor 17. The pulse sensor 15 generates a pulse signal (sensor signal) according to the rotational speed of the motor 17, and provides the microcomputer 12 with the pulse signal. To be more specific, the pulse signal has a pulse width, or a cycle, proportional to the rotational speed of the motor 17. The higher the rotational speed of the motor 17, the narrower the pulse width of the pulse signal generated by the pulse sensor 15. The lower the rotational speed of the motor 17, the wider the pulse width of the pulse signal generated by the pulse sensor 15.

[Motor Driving Circuit 16]

The motor driving circuit 16 includes a driving circuit (not shown) and a switching circuit (not shown). The driving circuit has a switching element (transistor). The switching circuit includes two relay circuits. The motor 17 is connected to the motor driving circuit 16. Further, a positive terminal +B of a battery mounted on the automobile is connected to the motor driving circuit 16. The motor driving circuit 16 receives, as a driving control signal, one of a forward-rotation control signal, a reverse-rotation control signal, and a stop signal, from the microcomputer 12. The motor driving circuit 16 switches its switching circuit (not shown) according to the driving control signal received from the microcomputer 12 to supply or stop the battery power to the motor 17. This causes the motor 17 to rotate in the forward direction or in the reverse direction, or to stop. To be more specific, the driving circuit establishes or interrupts connection between the positive terminal +B of the battery and the switching circuit by switching (on and off) the switching element. The switching circuit switches the power supply path to the motor 17 between the power supply path for forward rotation and the power supply path for reverse rotation by switching its two relay circuits.

[Motor 17]

The motor 17 is a DC motor for operating the window glass. The motor 17 is driven (rotated) using the battery mounted on the automobile as its driving power supply. An output shaft of the motor 17 is linked to a mechanism for raising and lowering the window glass (not shown). The raising mechanism is provided, for example, in a side door of the automobile. When the motor 17 is rotated in the forward direction, the raising mechanism opens (lowers) the window glass. When the motor 17 is rotated in the reverse direction, the raising mechanism closes (raises) the window glass.

[Microcomputer 12]

The microcomputer 12 includes a calculation unit 21, a storage unit 22, and a timer 23.

The calculation unit 21 includes a microprocessor (MPU). The calculation unit 21 executes various calculation processes according to various control programs prestored in the storage unit 22.

The storage unit 22 includes a read-only memory (ROM) 22a and a random-access memory (RAM) 22b.

The ROM 22a prestores various control programs including power window control programs to be executed by the calculation unit 21. The power window control programs include a program for controlling the operation of the window glass, a program for preventing obstruction by a foreign object in the window glass, and a program, used when the engine is stopped, for preventing erroneous detection of obstruction by a foreign object.

The ROM 22a further prestores various data for controlling the power window apparatus 10. The data includes a first obstruction determination threshold P1 and a second obstruction determination threshold P2. The first obstruction determination threshold P1 is used as a reference for determining whether a foreign object has been caught between the window glass and the window frame while the engine is being operated. The first obstruction determination threshold P1 is set based on a pulse cycle of the motor 17. The second obstruction determination threshold P2 is used as a reference for determining whether a foreign object has been caught between the window glass and the window frame when the engine is stopped. The second obstruction determination threshold P2 is set based on a pulse cycle of the motor 17.

The second obstruction determination threshold P2 is set larger than the first obstruction determination threshold P1 (P1<P2). To be more specific, a value obtained by adding $\alpha$ value a to the first obstruction determination threshold P1 is equal to the second obstruction determination threshold P2 ($P2=P1+\alpha$, where $\alpha>0$). The value $\alpha$ is set in a manner to prevent erroneous detection of the obstruction even when the battery voltage decreases after the engine is stopped. Further, when the battery voltage is decreasing after the engine is stopped, the pulse cycle is lengthened. The second obstruction determination threshold P2 is determined based on the lengthened degree of the pulse cycle. The first and second obstruction determination thresholds P1 and P2 are obtained by experimental data and a known theoretical calculation.

The RAM 22b provides a data work area where the calculation unit 21 expands various control programs stored in the ROM 22a and executes various calculation processes. Also, the RAM 22b temporarily stores results of the calculation processes executed by the calculation unit 21.

The timer 23 measures the time elapsed from when the engine is stopped. The timer 23 provides the calculation unit 21 with a count-up signal when the measured time reaches a preset voltage stabilization time $\delta t$. Upon receipt of the count-up signal, the calculation unit 21 resets the timer 23. When the engine is stopped, the battery voltage decreases as time elapses, and is stabilized at a predetermined lower limit. The voltage stabilization time $\delta t$ is a time period from when the engine is stopped to when the battery voltage is stabilized at the predetermined lower limit. The voltage stabilization time $\delta t$ is obtained in advance by experiments and a known theoretical calculation. The voltage stabilization time $\delta t$ is prestored in the ROM 22a.

The microcomputer 12 with the above-described structure provides the motor driving circuit 16 with a driving control signal (forward-rotation control signal, reverse-rotation control signal, or stop signal), according to an opening-operation signal OPN or a closing-operation signal CLS provided from the window switch 13. The motor driving circuit 16 rotates the motor 17 in the forward direction or in the reverse rotation or stops the motor 17 according to the driving control signal.

The microcomputer 12 executes a process for detecting obstruction by a foreign object (hereafter referred to as a "obstruction detection process") based on pulse signals (specifically based on a cycle difference sum of pulse signals described later) provided from the pulse sensor 15. To be more specific, the microcomputer 12 compares a cycle difference sum of pulse signals obtained within a predetermined sampling time, with the first obstruction determination threshold P1 or with the second obstruction determination threshold P2. When the cycle difference sum is above the target obstruction determination threshold (the first obstruction determination threshold P1 or the second obstruction determination threshold P2), the microcomputer 12 determines that a foreign object has been caught in the window glass. The microcomputer 12 determines whether a foreign object has been caught in the window glass based on the first obstruction determination threshold P1 while the engine is being operated. The microcomputer 12 determines whether a foreign object has been caught in the window glass based on the second obstruction determination threshold P2 when and after the engine is stopped until the voltage stabilization time $\delta t$ elapses.

The microcomputer 12 determines that the engine is operated when receiving an IG-ON signal S1 from the ignition switch 14. The microcomputer 12 determines that the engine is stopped when receiving an IG-OFF operation signal S2 from the ignition switch 14. In response to the IG-ON signal S1, the microcomputer 12 executes an anti-erroneous-detection program used while the engine is being operated. In response to the IG-OFF operation signal S2, the microcomputer 12 executes an anti-erroneous-detection program used when the engine is stopped.

[Operations of the Power Window Apparatus 10 According to the Preferred Embodiment]

[Opening and Closing Operations of the Window Glass]

The following describes the operations of the window glass in the power window apparatus 10 with the above-described structure.

When the window switch 13 is operated to open the closed window glass by, for example, a driver, the microcomputer 12 is provided with an opening-operation signal OPN from the window switch 13 via the first input terminal IN1. The microcomputer 12 then provides the motor driving circuit 16 with a driving control signal (forward-rotation control signal) via the output terminal OUT. According to the driving control signal (forward-rotation control signal), the motor driving circuit 16 switches on the switching element of its driving circuit, and at the same time, switches its switching circuit to form the power supply path for forward rotation (opening operation) to the motor 17. As a result, the motor 17 is supplied with battery power and rotates in the forward direction. This opens (lowers) the window glass.

When, for example, a limit switch (not shown) connected to the microcomputer 12 detects that the window glass has been fully opened, the limit switch provides the microcomputer 12 with a fully-open-position signal. According to the fully-open-position signal provided from the limit switch, the microcomputer 12 provides the motor driving circuit 16 with a stop signal via the output terminal OUT. The motor driving circuit 16 then switches off the switching element of its driving circuit to stop electrical power supply to the motor 17. This completes the opening operation for the window glass.

When the window switch 13 is operated to close the open window glass by, for example, a driver, the microcomputer 12 is provided with a closing-operation signal CLS from the window switch 13 via the first input terminal IN1. The microcomputer 12 then provides the motor driving circuit 16 with a driving control signal (reverse-rotation control signal) via the output terminal OUT. According to the driving control signal (reverse-rotation control signal), the motor driving circuit 16 switches on the switching element of its driving circuit, and switches its switching circuit to form the power supply path for reverse rotation (closing operation) to the motor 17. As a result, the motor 17 is supplied with the battery power, and rotates in the reverse direction. This closes (raises) the window glass.

When, for example, the limit switch (not shown) connected to the microcomputer 12 detects that the window glass has been fully closed, the limit switch provides the microcomputer 12 with a fully-closed-position signal. According to the fully-closed-position signal from the limit switch, the microcomputer 12 provides the motor driving circuit 16 with a stop signal via the output terminal OUT. The motor driving circuit 16 then switches off the switching element of its driving circuit, to stop-electrical power supply to the motor 17. This completes the closing operation for the window glass.

[Foreign Object Obstruction Detection Process]

The following describes the obstruction detection process. The obstruction detection process is executed in accordance with an anti-obstruction program stored in the ROM 22a. For example, when a foreign object such as a finger is caught between the window glass and the window frame while the window glass is being closed, the closing of the window glass can no longer be continued. If this happens, the detector 11 detects that a foreign object has been caught in the window glass and opens the window glass to free the foreign object based on the anti-obstruction program. This anti-obstruction program is executed when the closing operation of the window glass is started, and is thereafter repeatedly executed at every predetermined control cycle during the closing operation of the window glass.

In the preferred embodiment, detection of a foreign object caught between the window glass and the window frame (hereafter referred to as "obstruction detection") is performed using the pulse detection method. According to the pulse detection method, the microcomputer 12 determines whether a foreign object has been caught, based on a pulse signal of the motor 17 generated by the pulse sensor 15. A pulse signal generated by the pulse sensor 15 has a cycle proportional to the rotational speed of the motor 17 for opening or closing the window glass. To be more specific, the higher the rotational speed of the motor 17, the shorter the pulse cycle. The lower the rotational speed of the motor 17, the longer the pulse cycle. By utilizing such characteristics of the pulse cycle, the microcomputer 12 performs the obstruction detection in the following way.

When the motor 17 rotates at a fixed speed to close the window glass while the engine is being operated, the pulse sensor 15 generates a pulse signal having a fixed cycle. The pulse sensor 15 provides the microcomputer 12 with the generated pulse signal. Upon every receipt of a pulse signal from the pulse sensor 15, the microcomputer 12 calculates a cycle of the pulse signal. The microcomputer 12 averages pulse cycles of pulse signals received within a predetermined time period, to calculate an average pulse cycle Tave. To be more specific, the microcomputer 12 sums a pulse cycle T0 of the presently received pulse signal, and pulse cycles T1 to T(n−1) of the (n−1) pulse signals preceding the presently received pulse signal. The microcomputer 12 then divides the sum by n, to obtain the average pulse cycle Tave (Tave={T0+T1+ . . . +T(n−1)}/n). If pulse cycles of pulse signals provided from the pulse sensor 15 are uniform, the resulting average pulse cycles Tave are also uniform.

Then, the microcomputer 12 calculates a cycle difference value $\Delta T$ for every predetermined control cycle ($\Delta T=|T0-Tave|$). To be more specific, the microcomputer 12 calculates a difference between the pulse cycle T0 of the presently received pulse signal and the average pulse cycle Tave to obtain the cycle difference value $\Delta T$. The microcomputer 12 then compares the cycle difference value $\Delta T$ with a preset cycle difference value determination threshold $\Delta Th$. A cycle difference value determination threshold $\Delta Th$ is hereafter referred to as a cycle difference threshold $\Delta Th$. Based on the result of the comparison, the microcomputer 12 determines whether a change in the pulse cycle is caused by impacts or vibrations generated by opening or closing of a door or the like. The cycle difference threshold $\Delta Th$ is obtained in advance by experiments and a known theoretical calculation and is prestored in the ROM 22a.

When determining that a change in the pulse cycle is caused by impacts or vibrations generated by opening or closing of the door, the microcomputer 12 does not execute subsequent processing for the obstruction detection. In this way, the microcomputer 12 avoids erroneous obstruction detection. When determining that a change in the pulse cycle is not caused by impacts or vibrations generated by opening or closing the door, the microcomputer 12 calculates a cycle difference sum $\Delta Ts$ (i.e., executes a determination target value calculation process). To be more specific, the microcomputer 12 sums a cycle difference value $\Delta T0$ of the presently received pulse signal and cycle difference values ΔT1 to ΔT(m−1) of the (m−1) pulse signals preceding the presently received pulse signal to obtain the cycle difference sum ΔTs (ΔTs=ΔT0+ΔT1+ . . . +ΔT(m−1)).

The microcomputer 12 compares the cycle difference sum ΔTs with the first obstruction determination threshold P1 prestored in the ROM 22a (i.e., executes an obstruction determination process). When the cycle difference sum ΔTs is equal to or below the first obstruction determination threshold P1, the microcomputer 12 determines that nothing has been caught in the window glass, and maintains the driving of the motor 17. As a result, the closing operation of the window glass is continued.

When the cycle difference sum ΔTs is above the first obstruction determination threshold P1, the microcomputer 12 determines that a foreign object has been caught in the window glass, and provides the motor driving circuit 16 with a driving control signal. The motor driving circuit 16 stops or reverses the motor 17 according to the driving control signal. This stops the movement of the window glass to prevent the foreign object from being further caught in the window glass or opens the window glass to free the foreign object.

[Relationship between Battery Voltage and Pulse Cycle After the Engine is Stopped]

The following describes the relationship between the battery voltage and the pulse cycle after the engine is stopped.

As shown in FIG. 2, when the engine is stopped (t1) by switching the ignition switch 14 from the ON position to one of the ACC position, the OFF position, and the LOCK position, the battery voltage starts decreasing gradually. The battery voltage starts decreasing because an alternator (AC generator) is stopped when the engine is stopped. As the battery voltage decreases, the rotational speed of the motor 17 decreases. This means that a pulse cycle of a pulse signal generated by the pulse sensor 15 is longer when the engine is being stopped than when the engine is being operated. The battery voltage decreases until it reaches a predetermined lower limit (t2), and is thereafter stabilized at the lower limit. After the stabilization, the motor 17 rotates at a fixed speed and the pulse sensor 15 generates a pulse signal having a fixed pulse cycle. In the preferred embodiment, the battery voltage is 14V while the engine is being operated. The battery voltage starts decreasing gradually when the engine is stopped and is then stabilized at 12.5V.

Also, the time period from when the engine is stopped (t1) by switching the ignition switch 14 from the ON position to one of the ACC position, the OFF position, and the LOCK position, to when a predetermined time elapses is set as a window switch operable time ts, during which the window switch 13 may be operated. Thus, even after the engine is stopped, the window switch 13 may be operated to supply power to the motor 17 and to open or close the window glass within the operable time ts. Even if, for example, the engine is stopped when the window glass is being closed, the closing operation of the window glass is continued until the window glass is fully closed.

After the engine is stopped, the microcomputer 12 continues the above-described obstruction detection process until the operable time ts elapses. The microcomputer 12 executes an anti-erroneous-detection process described later until the battery voltage is stabilized at the predetermined lower limit after the engine is stopped, that is, until the voltage stabilization time δt elapses after the engine is stopped.

[Anti-Erroneous-Detection Process after the Engine is Stopped]

The following describes the anti-erroneous-detection process executed after the engine is stopped, with reference to the flowchart shown in FIG. 3. The processing shown in this flowchart is executed in accordance with the anti-erroneous-detection program prestored in the ROM 22a. Hereafter, "step" is abbreviated as "S".

As shown in FIG. 3, the microcomputer 12 determines whether the engine is stopped (S111). In the preferred embodiment, the microcomputer 12 determines that the engine is stopped when receiving an IG-OFF operation signal S2 from the ignition switch 14. This is based on the fact that the ignition switch 14 is operated to be off when the engine is stopped. To be more specific, the ignition switch 14 is switched from the ON position to one of the ACC position, the OFF position, and the LOCK position when the engine is stopped. In other words, the microcomputer 12 starts the anti-erroneous-detection process in response to an IG-OFF operation signal S2 provided when the ignition switch 14 is moved to another position from the ON position.

When determining that the engine is being operated ("NO" in S111), the microcomputer 12 repeats the processing in S111. When determining that the engine is stopped. ("YES" in S111), the microcomputer 12 proceeds to S112, and at the same time, actuates the timer 23 (S113).

In S112, the microcomputer 12 changes the obstruction determination threshold used in the obstruction detection in a manner that a foreign object is determined as being caught in a window glass with a lower probability when the engine is stopped than while the engine is being operated. To be more specific, the microcomputer 12 reads the second obstruction determination threshold P2 stored in the ROM 22a into the RAM 22b and determines whether a foreign object has been caught in a window glass based on the second obstruction determination threshold P2. The second obstruction determination threshold P2 is set by considering the influence of changes in the pulse cycle within the voltage stabilization time δt. Thus, the microcomputer 12 avoids erroneous determination that a foreign object has been caught based on a change in the pulse cycle caused by a decrease in the battery voltage within the voltage stabilization time δt. Even when, for example, the engine is stopped during the closing operation of the window glass, the microcomputer 12 does not determine that a foreign object has been caught in the window glass based on a change in the pulse cycle caused by the stopping of the engine. The window glass is moved until it is fully closed.

Following this, the microcomputer 12 determines whether the voltage stabilization time δt has elapsed (S114). The microcomputer 12 determines that the voltage stabilization time δt has elapsed when receiving the count-up signal from the timer 23. The microcomputer 12 determines that the voltage stabilization time δt has not elapsed when the count-up signal is not received from the timer 23.

When determining that the voltage stabilization time δt has not elapsed ("NO" in S114), the microcomputer 12 repeats the processing in S114. In this state, the microcomputer 12 continues the obstruction detection process based on the second obstruction determination threshold P2. When determining that the voltage stabilization time δt has elapsed ("YES" in S114), the microcomputer 12 uses the first obstruction determination threshold P1 again as the threshold in the obstruction detection process (S115). Hereafter, the microcomputer 12 executes the obstruction detection process based on the first obstruction determination threshold P1. When the operable time ts has elapsed, the microcomputer 12 ends execution of the anti-erroneous detection program.

As described above, the detector 11 according to the preferred embodiment utilizes the characteristic that the battery voltage continues to decrease until the voltage stabilization time δt elapses after the engine is stopped. Until the voltage stabilization time δt elapses after the engine is stopped, the microcomputer 12 uses the second obstruction determination threshold P2, which is larger than the first obstruction determination threshold P1 used when the engine is being operated, regardless of whether the battery voltage and the pulse cycle change. To be more specific, when the engine is stopped, the microcomputer 12 always changes the obstruction determination threshold to be used in the obstruction detection from the first obstruction determination threshold P1 to the second obstruction determination threshold P2. The detector 11 does not require a complex program for preventing erroneous detection of obstruction by a foreign object, that is, a complex program for detecting a gradual change in the battery voltage or in the pulse cycle when the engine is stopped, and executing the obstruction detection process in consideration of the influence of such a gradual change. This also prevents the processing load of the microcomputer 12 from being drastically increased. The obstruction determination threshold to be used in the obstruction detection is changed when the engine is stopped in a manner that a foreign object is determined as being caught with a lower probability than when the engine is being operated. By changing the obstruction determination threshold in this way, the microcomputer 12 avoids erroneous obstruction detection based on an increase in the pulse cycle caused by a decrease in the battery voltage when the engine is stopped.

If the first obstruction determination threshold P1 is continuously used as the obstruction determination threshold after the engine is stopped unlike in the preferred embodiment, the microcomputer of the detector may fail to avoid erroneous obstruction detection based on an increase in the pulse cycle caused by a decrease in the battery voltage when the engine is stopped.

In the preferred embodiment, the battery voltage corresponds to a power supply voltage. The cycle of the pulse signal generated by the pulse sensor 15 corresponds to a parameter. The cycle difference sum ΔTs corresponds to a determination target value. The voltage stabilization time δt corresponds to a parameter stabilization time. The pulse sensor 15 corresponds to a parameter detection unit. The motor driving circuit 16 corresponds to a motor control unit. The timer 23 corresponds to a timer unit.

The microcomputer 12 corresponds to a determination target value calculation unit for calculating a determination target value and a determination unit for determining whether a foreign object has been caught. Further, the microcomputer 12 corresponds to an engine-stop detection unit for detecting that the engine is stopped and a threshold change unit for changing the obstruction determination threshold. To be more specific, the microcomputer 12 executes the processing in S111 as the engine-stop detection unit and the processing in S112 as the threshold change unit.

[Advantages of the Preferred Embodiment]

The detector 11 of the preferred embodiment has the following advantages.

(1) The detector 11 for detecting obstruction by a foreign object includes the pulse sensor 15, which generates a pulse signal having a cycle according to the rotational speed of the motor 17. The detector 11 further includes the microcomputer 12, which calculates the cycle difference sum ΔTs based on cycles of pulse signals generated by the pulse sensor 15, compares the cycle difference sum ΔTs with a preset obstruction determination threshold, and determines whether a foreign object has been caught based on the result of the comparison. The microcomputer 12 changes the obstruction determination threshold when detecting that the engine is stopped in a manner that a foreign object is determined as being caught with a lower probability than when the engine is being operated.

To be more specific, the microcomputer 12 uses the first obstruction determination threshold P1 when the engine is being operated, and uses the second obstruction determination threshold P2 (P2>P1) when the engine is stopped. By changing the obstruction determination threshold in this way, a foreign object is determined as being caught with a lower probability when the engine is stopped than when the engine is being operated. Even when the pulse cycle of the motor 17 is lengthened as the battery voltage decreases when the engine is stopped, erroneous obstruction detection based on such a change in the pulse cycle is avoided. This is because the second obstruction determination threshold P2 is set in consideration of the influence of changes in the pulse cycle caused by stopping the engine. This prevents erroneous obstruction detection when, for example, the engine is stopped during the closing operation of the window glass.

(2) The microcomputer 12 changes the obstruction determination threshold when detecting that the engine is stopped, regardless of whether the battery voltage and the pulse cycle of the motor 17 change. To be more specific, when detecting that the engine is stopped, the microcomputer 12 changes the obstruction determination threshold to be used in the obstruction detection from the first obstruction determination threshold P1 to the second obstruction determination threshold P2 (P2>P1). Thus, the microcomputer 12 is not required to detect a gradual change in the battery voltage when the engine is stopped and to execute the obstruction detection process in consideration of such a gradual change. This enables the detector 11 according to the preferred embodiment to prevent erroneous obstruction detection when the engine is stopped and while the engine is being operated, using a control program simpler than a control program used by a detector detecting obstruction by a foreign object by considering both sudden and gradual changes in the battery voltage.

(3) The microcomputer 12 determines that the engine is stopped in response to an ignition-OFF operation signal provided from the ignition switch 14. This is based on the fact that the ignition switch 14 is switched from the ON position to one of the ACC position, the OFF position, and the LOCK position when the engine is stopped by the driver. An IG-OFF operation signal S2 (ignition-OFF operation signal), which is provided from the ignition switch 14 when the ignition switch 14 is switched from the ON position to one of the ACC position, the OFF position, and the LOCK position, enables the microcomputer 12 to detect that the engine is stopped. For example, the microcomputer 12 receives an IG-OFF operation signal S2 from the ignition switch 14 via the CAN (Controller Area Network, which is a specific LAN for vehicles). Thus, the microcomputer 12 easily detects that the engine is stopped.

(4) The detector 11 includes the timer 23. The timer 23 is actuated when the stopping of the engine is detected and provides the calculation unit 21 of the microcomputer 12 with a count-up signal when the preset voltage stabilization time δt elapses after the engine is stopped. In response to the count-up signal provided from the timer 23, the microcomputer 12 changes the obstruction determination threshold to be used in the obstruction detection from the second obstruction determination threshold P2 back to the first obstruction determination threshold P1. Even when the voltage stabilization time δt elapses after the stopping of the engine is detected, the detector 11 detects obstruction by a foreign object (until the operable time ts elapses) in the same manner as when the engine is being operated.

(5) The storage unit 22 prestores the first obstruction determination threshold P1 and the second obstruction determination threshold P2, which is larger than the first obstruction determination threshold P1. The microcomputer 12 uses the first obstruction determination threshold P1 when the engine is being operated and uses the second obstruction determination threshold P2 when stopping of the engine is detected. The microcomputer 12 prevents erroneous obstruction detection simply by reading the first obstruction determination threshold P1 or the second obstruction determination threshold P2 from the storage unit 22 according to the vehicle's state (whether the engine is stopped or not) and using the read obstruction determination threshold. The detector 11 uses a control program that is simpler than a control program for calculating a suitable obstruction determination threshold in every obstruction detection process depending on the battery voltage or the pulse cycle. Thus, the processing load of the microcomputer 12 for calculation processes is reduced.

(6) The detector 11 includes the pulse sensor 15, which generates a pulse signal having a cycle according to the rotational speed of the motor 17 for operating the window glass. Based on the cycle of the pulse signal generated by the pulse sensor 15, the microcomputer 12 determines whether a foreign object has been caught.

(7) The power window apparatus 10 includes the detector 11. Thus, when stopping of the engine is detected, erroneous obstruction detection is prevented regardless of whether the battery voltage and the pulse cycle of the motor 17 change.

It should be apparent to those skilled in the art that the present invention may be embodied in many other specific forms without departing from the spirit or scope of the invention. Particularly, it should be understood that the present invention may be embodied in the following forms.

In the preferred embodiment, the detector of the present invention is applied to the detector 11 employing the pulse detection method. The present invention should not be limited to such a structure. The detector of the present invention may be applied to a detector employing a voltage/current detection method. The obstruction detection may be performed based on any parameter that changes as the battery voltage (power supply voltage) changes. For example, the detector may perform the obstruction detection based on rotational speed of the motor 17, a deceleration ratio of the motor 17, a voltage supplied to the motor 17 (motor voltage), or a current supplied to the motor 17 (motor current). When detecting that the engine is stopped, a detector performing the obstruction detection based on any of these parameters changes the obstruction determination threshold to be used in the obstruction detection in a manner that a foreign object is determined as being caught with a lower probability regardless of whether the parameter changes. To be more specific, the detector changes the obstruction determination threshold to be used in the obstruction detection from the first obstruction determination threshold P1 to the second obstruction determination threshold P2 (P1<P2). The first obstruction determination threshold P1 and the second obstruction determination threshold P2 are set in advance according to each parameter. This structure enables the advantages (1) to (7) of the preferred embodiment to be obtained.

In the preferred embodiment, the microcomputer 12 uses the second obstruction determination threshold P2 in the obstruction detection when stopping of the engine is detected and uses the first obstruction determination threshold P1 in the obstruction detection when the voltage stabilization time δt elapses. The present invention should not be limited to such a structure. The detector may also use the second obstruction determination threshold P2 in the obstruction detection even after the voltage stabilization time δt elapses.

In the preferred embodiment, the engine is started by inserting the ignition key in the key slot of the key cylinder and switching the ignition switch 14 to the START position. The present invention should not be limited to such a structure. The detector of the present invention may be applied to a power steering device for a vehicle (automobile) having a "smart key" system. In the smart key system, the driver, holding an electronic key (smart key), turns an engine-starting knob (operation unit) provided in the vicinity of the driver's seat. The turning of the engine-starting knob causes the ignition switch to be operated to start the engine. To be more specific, the turning of the engine-starting knob causes the ignition switch 14, which is linked to the engine-starting knob, to be switched to the LOCK position, the ACC position, the ON position, and the START position. In the smart key system, the ignition key does not need to be inserted in the key slot of the key cylinder. In this structure, the second obstruction determination threshold P2 is also used when the ignition switch 14 is moved to another position from the ON position, that is, when the ignition switch 14 is switched from the ON position to one of the ACC position, the OFF position, and the LOCK position.

The present examples and embodiments are to be considered as illustrative and not restrictive, and the invention is not to be limited to the details given herein, but may be modified within the scope and equivalence of the appended claims.

What is claimed is:

1. A detector for detecting a foreign object caught in a window glass of a vehicle having an engine when the window glass is moved by a power window apparatus that is provided with power supply voltage from the vehicle, the detector comprising:

a parameter detection unit for detecting at least one parameter that changes as the power supply voltage to the power window apparatus changes;

a determination target value calculation unit, connected to the parameter detection unit, for calculating a determination target value based on the at least one parameter detected by the parameter detection unit;

a determination unit for comparing the determination target value with a predetermined determination threshold and determining whether a foreign object has been caught based on a result of the comparison;

an engine-stop detection unit for detecting whether the engine of the vehicle is stopped; and a threshold change unit for changing, when the engine-stop detection unit detects that the engine is stopped, the determination threshold so that the probability of the determination unit determining that a foreign object has been caught is lower than that when the engine is being operated.

2. The detector according to claim 1, wherein the vehicle includes an ignition switch connected to the engine-stop detection unit and is switchable to different positions, including an ON position, an accessory position, an OFF position, and a lock position, the ignition switch providing the engine-stop detection unit with an ignition-OFF operation signal when switched from the ON position to one of the accessory position, the OFF position, and the lock position, and the engine-stop detection unit detects that the engine is stopped in response to the ignition-OFF operation signal.

3. The detector according to claim 1, further comprising:
a timer unit that is actuated when the engine-stop detection unit detects that the engine is stopped, the timer unit providing the threshold change unit with a count-up signal when a predetermined time elapses after the engine is stopped, wherein the threshold change unit returns the determination threshold to the value used before the engine is stopped in response to the count-up signal provided from the timer unit.

4. The detector according to claim 1, wherein the determination threshold includes a first determination threshold and a second determination threshold larger than the first determination threshold, and the threshold change unit uses the first determination threshold when the engine-stop detection unit does not detect that the engine is stopped and uses the second determination threshold when the engine-stop detection unit detects that the engine is stopped.

5. The detector according to claim 1, wherein,
the power window apparatus includes a motor, connected to the parameter detection unit, for moving the window glass;
the parameter detection unit detects rotational speed of the motor, generates a pulse signal having a cycle that is in accordance with the rotational speed of the motor, and provides the determination target value calculation unit with the pulse signal; and
the determination target value calculation unit calculates the determination target value based on the pulse signal.

6. A detector for detecting a foreign object caught in a window glass of a vehicle having an engine when the window glass is moved by a motor, the detector comprising:
a sensor, connected to the motor, for detecting rotational speed of the motor and generating a sensor signal according to the rotational speed of the motor; and
a microcomputer, connected to the sensor, for calculating a determination target value based on the sensor signal provided from the sensor, comparing the determination target value with a first determination threshold when the engine of the vehicle is being operated, comparing the determination target value with a second determination threshold during a period from when the engine of the vehicle is stopped to when a predetermined time elapses after the engine is stopped, and determining whether a foreign object has been caught based on a result of the comparison.

7. The detector according to claim 6, wherein the motor is connected to an electrical power supply that supplies the motor with power, and the predetermined time is the time from when the engine of the vehicle is stopped to when voltage of the electrical power supply that supplies the motor with power is stabilized.

8. A power window apparatus for mounting on a vehicle having an engine, an electrical power supply and a window glass for connection to the electrical power supply and opening and closing the window glass of the vehicle, the power window apparatus comprising:
a window switch operated to open or close the window glass and for outputting an opening-operation signal or a closing-operation signal;
a motor used to open and close the window glass and for connection to the electrical power supply;
a motor control unit, connected to the motor, for controlling the motor, wherein the motor control unit rotates the motor in a forward direction in response to the opening-operation signal provided from the window switch, and rotates the motor in a reverse direction in response to the closing-operation signal provided from the window switch; and
a detector, connected to the window switch and the motor control unit, for detecting whether a foreign object has been caught in the window glass, the detector including:
a parameter detection unit for detecting at least one parameter that changes as voltage of the electrical power supply connected to the motor changes;
a determination target value calculation unit, connected to the parameter detection unit, for calculating a determination target value based on the at least one parameter detected by the parameter detection unit;
a determination unit for comparing the determination target value with a predetermined determination threshold and determining whether a foreign object has been caught based on a result of the comparison;
an engine-stop detection unit for detecting whether the engine of the vehicle is stopped; and
a threshold change unit for changing, when the engine-stop detection unit detects that the engine is stopped, the determination threshold so that the probability of the determination unit determining that a foreign object has been caught is lower than that when the engine is being operated,
wherein the motor control unit controls the motor to stop or open the window glass when the detector detects that a foreign object has been caught in the window glass.

9. A power window apparatus for mounting on a vehicle having an engine and a window glass for opening and closing the window glass of the vehicle, the power window apparatus comprising:
a window switch operated to open or close the window glass and for outputting an opening-operation signal or a closing-operation signal;
a motor used to open and close the window glass;
a motor driving circuit, connected to the motor, for controlling the motor;
a sensor, connected to the motor, for detecting rotational speed of the motor and generating a sensor signal according to the rotational speed of the motor; and
a microcomputer, connected to the window switch, the sensor and the motor driving circuit, for calculating a determination target value based on the sensor signal provided from the sensor, comparing the determination target value with a first determination threshold when the engine of the vehicle is being operated, comparing the determination target value with a second determination threshold during a period from when the engine of the vehicle is stopped to when a predetermined time elapses after the engine is stopped, determining whether a foreign object has been caught in the window glass based on a result of the comparison, and when determining that a foreign object has been caught, generating a driving control signal to control the motor to stop or open the window glass, and providing the motor driving circuit with the driving control signal.

10. A method for detecting whether a foreign object has been caught in a window glass of a vehicle having an engine when the window glass is moved by a power window apparatus connected to an electrical power supply, the method comprising:

detecting at least one parameter that changes as voltage of the electrical power supply connected to the power window apparatus changes;

calculating a determination target value based on the detected parameter;

comparing the determination target value with a first determination threshold;

determining whether a foreign object has been caught based on a result of the comparison between the determination target value and the first determination threshold; and changing a target threshold with which the determination target value is to be compared from the first determination threshold to a second determination threshold when the engine of the vehicle is stopped so that the probability of determining that a foreign object has been caught is lower than that when the engine is being operated.

11. The method according to claim 10, further comprising:

changing a target threshold from the second determination threshold to the first determination threshold when the voltage of the electrical power supply is stabilized after the engine of the vehicle is stopped.

12. The method according to claim 10, wherein the power window apparatus includes a motor for moving the window glass and said detecting at least one parameter includes detecting rotational speed of the motor for moving the window glass.

13. A computer-readable medium comprising a program recorded thereon for detecting whether a foreign object has been caught in a window glass of a vehicle having an engine when the window glass is moved by a power window apparatus connected to an electrical power supply, the program when executed by a computer causing the computer to perform steps including:

detecting at least one parameter that changes as voltage of the electrical power supply connected to the power window apparatus changes;

calculating a determination target value based on the detected parameter;

comparing the determination target value with a first determination threshold;

determining whether a foreign object has been caught based on a result of the comparison between the determination target value and the first determination threshold; and changing a target threshold with which the determination target value is to be compared from the first determination threshold to a second determination threshold when the engine of the vehicle is stopped so that the probability of determining that a foreign object has been caught is lower than that when the engine is being operated.

14. The medium according to claim 13, wherein the program further causes the computer to perform steps including:

changing the target threshold from the second determination threshold to the first determination threshold when the power supply voltage is stabilized after the engine of the vehicle is stopped.

15. The medium according to claim 13, wherein the power window apparatus includes a motor for moving the window glass and said detecting at least one parameter includes detecting rotational speed of the motor for moving the window glass.

\* \* \* \* \*